US006341633B1

(12) United States Patent
Adlon et al.

(10) Patent No.: US 6,341,633 B1
(45) Date of Patent: Jan. 29, 2002

(54) TIRE TREAD INCLUDING SIPE HAVING LEGS DEFINING V-SHAPE

(75) Inventors: Ralph Adlon, Otzberg; Elmar Farrenkopf, Mömlingen; Stefan Küster, Gross-Umstadt; Otto Sallein; Thomas Strothjohann, both of Breuberg, all of (DE)

(73) Assignee: Pirelli Reifenwerke GmbH & Co. KG, Breuberg (DE)

( * ) Notice: Subject to any disclaimer, the term of this patent is extended or adjusted under 35 U.S.C. 154(b) by 0 days.

(21) Appl. No.: 09/341,050

(22) PCT Filed: Jan. 2, 1998

(86) PCT No.: PCT/EP98/00011

§ 371 Date: Sep. 2, 1999

§ 102(e) Date: Sep. 2, 1999

(87) PCT Pub. No.: WO98/29268

PCT Pub. Date: Jul. 9, 1998

(30) Foreign Application Priority Data

Jan. 3, 1997 (DE) ......................................... 197 00 101

(51) Int. Cl.[7] .......................... B60C 11/11; B60C 11/12; B60C 107/00; B60C 111/00; B60C 113/00
(52) U.S. Cl. ................................ 152/209.3; 152/209.8; 152/209.18; 152/902; 152/DIG. 3
(58) Field of Search ......................... 152/209.8, 209.18, 152/902, DIG. 3, 209.21, 209.3

(56) References Cited

U.S. PATENT DOCUMENTS

| 2,850,066 A | 9/1958 | Nellen |
| 2,907,365 A | 10/1959 | MacDonald |
| 4,364,426 A | 12/1982 | Mills et al. |

(List continued on next page.)

FOREIGN PATENT DOCUMENTS

| DE | 31 46 362 | 9/1982 | |
| DE | 35 31 047 | 3/1987 | |
| EP | 0 590 916 | 4/1994 | |
| EP | 0 747 242 | 12/1996 | |
| GB | 2 093 777 | 9/1982 | |
| GB | 2 253 817 | 9/1982 | |
| GB | 2 253 816 | 9/1992 | |
| JP | 62-241708 | 10/1987 | |
| JP | 1-101204 | 4/1989 | |
| JP | 3-159804 | * 7/1991 | .............. 152/209.3 |
| JP | 3-182814 | 8/1991 | |
| JP | 3-243403 | 10/1991 | |
| JP | 5-178032 | 7/1993 | |
| JP | 6-32117 | * 2/1994 | ............ 152/DIG. 3 |
| JP | 5-76218 | 7/1995 | |

OTHER PUBLICATIONS

English–language Abstract of JP 1–101,204.
English–language Abstract of JP 3–182,814.
English–language Abstract of JP 3–243,403.
English–language Abstract of JP 5–178,032.
Partial English–language Translation of JP 5–76,218.
English–language Abstract of JP 62–241,708.
German U.M. 1 968 005 dated Sep. 7, 1967.

*Primary Examiner*—Steven D. Maki
(74) *Attorney, Agent, or Firm*—Finnegan, Henderson, Farabow, Garrett & Dunner, L.L.P.

(57) ABSTRACT

A tread for a vehicle tire includes at least one circumferentially extending longitudinal groove and transverse grooves emanating from the longitudinal groove for defining blocks in a pattern and sipes arranged in the tread. Each sipe defines a sipe depth extending from a pattern face of the tread toward a pattern base of the tread. At least one of the sipes is located in at least one of the blocks and is configured to have legs defining a V-shape. An intersection of the legs is arranged in a side surface area of the block facing the longitudinal groove. Ends of the legs are oriented away from the side surface area.

15 Claims, 2 Drawing Sheets

U.S. PATENT DOCUMENTS

| | | | |
|---|---|---|---|
| 4,779,656 A | * 10/1988 | Graas | 152/DIG. 3 |
| 5,031,680 A | * 7/1991 | Kajikawa et al. | 152/209.21 |
| 5,160,385 A | * 11/1992 | Goto et al. | 152/DIG. 1 |
| 5,307,851 A | 5/1994 | Yamashita | |
| 5,386,861 A | 2/1995 | Overhoff et al. | |
| 5,824,169 A | * 10/1998 | Landers et al. | 152/DIG. 3 |
| 5,964,266 A | * 10/1999 | Boiocchi et al. | 152/DIG. 3 |
| 5,964,267 A | * 10/1999 | Poque et al. | 152/902 |

* cited by examiner

TIRE TREAD INCLUDING SIPE HAVING LEGS DEFINING V-SHAPE

This application is a national stage entry under 35 U.S.C. § 371 from International Application No. PCT/EP98/00011, filed Jan. 2, 1998, in the European Patent Office; additionally, Applicant claims the right of priority under 35 U.S.C. § 119(a)–(d) based on patent application No. 197 00 101.7, filed Jan. 3, 1997, in the German Patent Office; the contents of both of which are relied upon and incorporated herein by reference.

The invention relates to a tread pattern for a vehicle tire including at least one circumferentially extending longitudinal groove and, emanating from the longitudinal groove, transverse grooves for defining blocks in the pattern and sipes arranged in the tread, the sipe depth extending from the pattern face in the direction of the pattern base.

In the case of such a pattern configuration the longitudinal grooves (extending circumferentially) dictate the side stability and prevent aquaplaning of such a tire. The transverse grooves (extending axially) have the task of a better transfer of driving, cornering and braking forces, whereby the transverse grooves may be oriented perpendicular or slanting to the circumferentially extending longitudinal groove. The sipes provided additionally in the tread of the tread pattern are necessary in increasing the number of traction edges and thus to improve the traction and braking response by positive contact.

Employing conventional sipes in the tread of the tread pattern of a tire is hampered by a number of disadvantages. Sipes configured as narrow cuts in the blocks of the tread pattern thus result in a reduction in stiffness of the individual blocks, as a result of which the individual blocks have a greater mobility involving drawbacks in tire handling and ride, especially in dry, wet and also snow-bound pavement conditions. In getting round such disadvantages it has hitherto been necessary to compensate inadequate block stiffness by specifically engineering the number, array and depth of the sipes which is, however, difficult and complicated and results in complicated tread patterns. This, last but not least, results in tire production costs being increased.

The present invention is based on the object of sophisticating a tread pattern for vehicle tires of the aforementioned kind such that the drawbacks cited in prior art are obviated. More particularly, the intention is to define a tread pattern for a vehicle tire which despite the use of sipes ensures a sufficiently high stiffness of the individual blocks of the pattern.

To achieve this object it is provided for in accordance with the invention that at least one of the sipes disposed in at least one of the blocks is configured V-shaped.

Due to this configuration of the sipes, a tread pattern is defined which features particularly good traction and braking response. This tread pattern additionally ensures an adequate stiffness of the individual blocks when stressed by transverse forces, so that the drawbacks pertinent to the prior art in tire handling and ride are obviated. Configuring the sipes in accordance with the invention achieves opening of the sipes as usual when stressed by longitudinal forces occurring in traction or braking, as a result of which the number of traction edges is increased. When loaded by transverse forces, as occurring, for instance, in cornering, the sipes close. This results in a stiffening of the pattern base. This stiffening materializes from the fact that due to the V-shaped configuration of the sipes, the individual wedge-shaped portions of the block, separated from each other by the V-shaped sipes, are capable of mutual support. Mutual slippage of the individual parts of the blocks, as possible in the case of conventional single-line sipes, is obviated by the sipe configuration in accordance with the invention. As a result and, especially in the presence of transverse forces, blocks are defined in the pattern which have adequate stiffness, resulting in, for instance, improved ride in dry, wet, or also snow-bound pavement conditions.

In the case of the tread pattern as provided for in accordance with the invention at least one of the sipes is configured V-shaped. It is, however, possible to also provide several V-shaped sipes per block, it being of advantage to provide a differing number of V-shaped sipes in each of the blocks when the blocks differ in length.

In one advantageous configuration of the invention the legs of the V-shaped sipe are equal in length.

In accordance with one preferred embodiment of the invention the intersection of the legs of the V-shaped sipe coincides with the side surface area of the block in which the V-shaped sipe is configured.

In accordance with another embodiment of the invention the intersection of the legs of the V-shaped sipe connects the side surface area of the block via a sipe web. In accordance with yet another embodiment of the invention it is provided for that the V-shaped sipe disposed in the block is not in contact with the side surface area of the block. Depending on the requirements on the tread pattern the individual array variants of the V-shaped sipes may be combined in the block or blocks of the pattern.

Where the V-shaped sipe is in contact with the side surface area of the block via a sipe web it can be provided for to advantage that the side surface area of the block comprises a nick in the portion connecting the sipe web.

It is of advantage when the depth of the sipe is between ¼ and the full depth of the block.

In one advantageous aspect of the invention the at least one block comprising at least one V-shaped sipe is configured at the outer shoulder and/or inner shoulder of the tread pattern. In accordance with a further embodiment of the present invention several blocks are provided, each comprising at least one V-shaped sipe. These blocks are disposed in accordance with the invention over the full surface area of the tread pattern in a fixed or random array.

In a further aspect of the invention the free ends of the legs of the at least one V-shaped sipe are oriented towards the center line of the tread pattern.

In accordance with a further embodiment of the invention, the intersection of the legs of the at least one V-shaped sipe is oriented towards the center line of the tread pattern, it being, however, also conceivable to define a tread pattern in which [swipes] sipes are provided having both orientations, as cited above.

In yet another aspect of the invention several blocks may be provided each comprising at least one V-shaped sipe, whereby the free ends of the legs and the intersections of the legs of individual V-shaped sipes are oriented towards the center line of the tread pattern. Furthermore, orientation of the V-shaped sipes of adjacent and/or opposite blocks may be unidirectional and/or opposing and/or alternating in direction.

Due to the V-shaped sipes disposed in the blocks of the pattern in accordance with the invention a tread pattern is defined which can be manufactured simply and cost-effectively and which ensures reliable handling and ride of the tire when stressed both by longitudinal forces and transverse forces. In this arrangement, by using one or more V-shaped sipes per block, by the special array of the V-shaped sipes within the block, by orienting the sipes within the block, by varying the length of the legs of the V-shaped sipes as well as by arranging the blocks provided with the V-shaped sipes in accordance with the invention within the tread pattern a wide variety of demands made on the tire can be taken into account, this being the reason why the tread pattern in accordance with the invention can be put to use in both dry, wet and also snow-bound pavement conditions.

The tread pattern in accordance with the invention finds application preferably on a winter tire, it however also being possible to employ the tread pattern in accordance with the invention on summer and all-season tires.

Configuring and functioning of example embodiments of the tread pattern in accordance with the invention will now be detained with respect to a schematic drawing in which.

Figure 1:
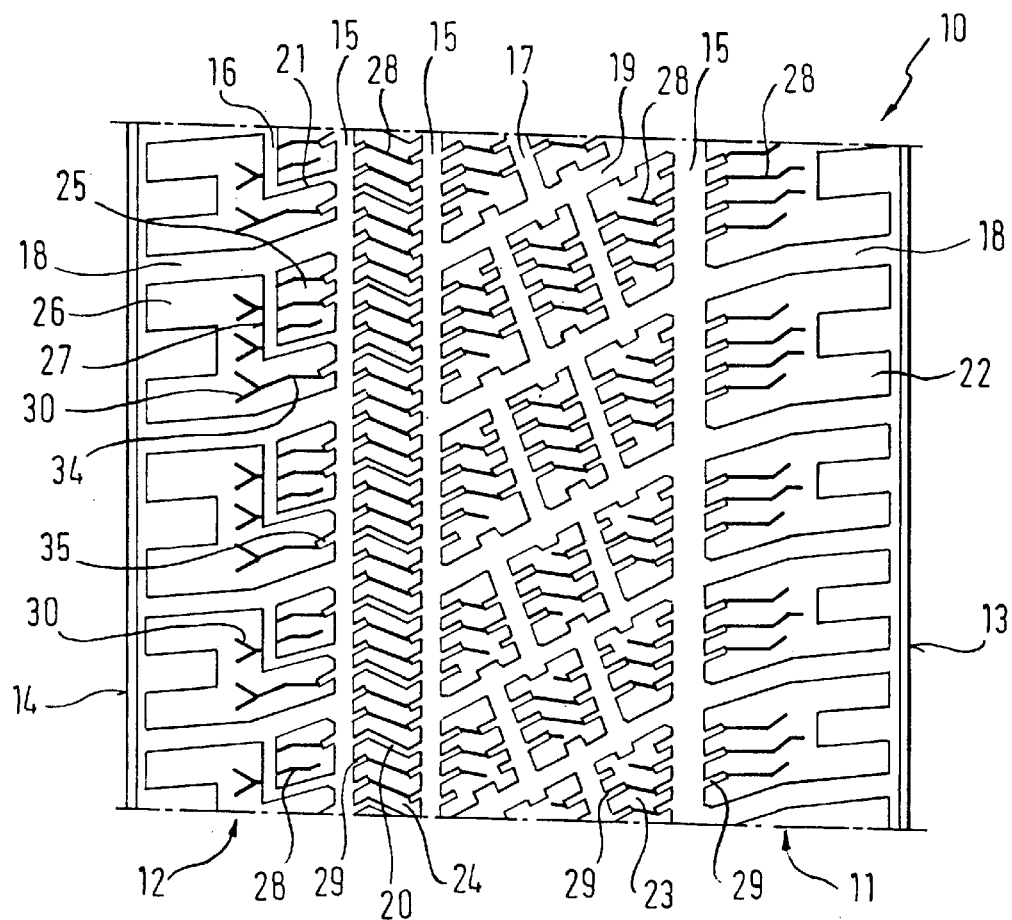
FIG. 1 is a fragmentary plan view of a tread pattern in accordance with the invention.

Referring to the plan view as shown in FIG. 1, there is illustrated a tread pattern 10 having longitudinal grooves 15, 16. Furthermore, a longitudinal groove 17 is provided oriented slightly inclined to the circumferentially extending direction of the tread pattern 10. The longitudinal groove 16 does not continually extend over the tread pattern 10, it instead being divided by portions of blocks 26 in the pattern.

The individual longitudinal grooves 15, 16, 17 are divided by transverse grooves 18, 19, 20, 21. These transverse grooves are oriented either perpendicular or slight inclined to the longitudinal grooves 15, 16, 17. The longitudinal grooves 15, 16, 17 and the transverse grooves 18, 19, 20, 21 define blocks 22, 23, 24, 25, 26 in the pattern. In this arrangement the blocks 22, 26 configured on the inner shoulder 11 and outer shoulder 12 of the tread pattern 10 are larger, whilst the blocks 23, 24 in the center portion of the tread pattern 10 are configured smaller. The blocks 25 likewise disposed in the region of the outer shoulder 12 correspond to the blocks 26.

Furthermore, the blocks 22, 23, 24, 25, 26 comprise sipes 28, 30 extending axially or slanting to the circumferentially extending direction of the tread pattern 10, the blocks in the region of the sipes comprising nicks 29, 35.

The tread pattern 10 is limited in its width extension by an inner edge 13 and an outer edge 14 which simultaneously form the outer conclusion of the inner shoulder 11 and the outer shoulder 12 respectively.

As evident furthermore from FIG. 1, the blocks 26 comprise V-shaped sipes 30. In the present example embodiment the blocks 28 are disposed in the outer shoulder 12 of the tread pattern 10. The blocks 26 feature a substantially H-shaped configuration, they being defined on the outer side by the outer edge 14 of the tread pattern 10. Further definitions of the blocks 26 are formed by the transverse grooves 18 and 21 as well as by the longitudinal grooves 15 and 16. The blocks 26 differ in width. The narrower blocks 26 are each provided with two V-shaped sipes 30, whilst the wider blocks 26 are provided with three V-shaped sipes 30. The free ends (as shown in FIG. 2) of the V-shaped sipes 30 are oriented in the direction of the outer edge 14.

In the example embodiment as shown in FIG. 1 two array variants of the V-shaped sipes 30 are illustrated. The V-shaped sipes 30 arranged in the leg of the H-shaped block 26 connect the side surface area 27 of the block 26 by a sipe web 34. In addition, the side surface area 27 of the block 26 comprises a nick 35 in the portion connecting the sipe web 34. The V-shaped sipes 30 disposed in the saddle of the H-shaped block 26 are arranged such that the intersection 33 of the legs 31, 32 (as shown in FIG. 2) of the V-shaped sipe 30 coincides with the side surface area 27 of the block 26.

Figure 2:
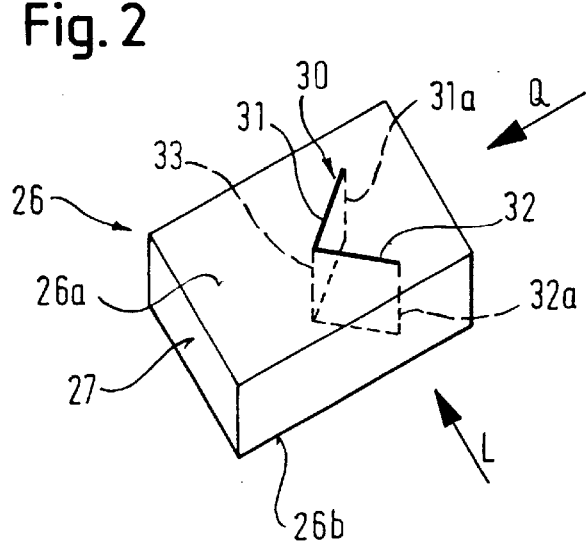
FIG. 2 is a schematic view of a block in the pattern in which a V-shaped sipe is configured.

Referring now to FIG. 2, there is illustrated greatly simplified a block 26 in which a V-shaped sipe 30 is configured. In this case the V-shaped sipe 30 is not in contact with the side surface area 27 of the block 26. The V-shaped sipe 30 comprises two legs 31, 32 the same in length which merge in the intersection 33. The free ends 31a, 32a of the legs 31, 32 opposite the intersection 33 are oriented away from the side surface area 27. As is evident in conjunction with FIG. 1 such an array of the sipes 30 results in the free ends 31a, 32a of the legs 31, 32 of the V-shaped sipes 30 being oriented in the direction of the outer edge 14 of the tread pattern 10. The depth of the V-shaped sipe 30 extends, as evident from the example embodiment with respect to FIG. 2, from the face surface 26a of the tread pattern down to the bottom 26b of the tread pattern and thus the depth of the sipe 30 corresponds to the full depth of the block 26. It is, however, possible to vary the depth of the V-shaped sipes.

In now describing the functioning of the V-shaped sipes 30 reference is made to the sipes 30 as illustrated in FIG. 1, oriented in the direction of the tread pattern 10. As evident from FIG. 2 the V-shaped sipes 30 are mainly stressed by longitudinal forces L and transverse forces Q. Longitudinal forces L occur, for example, due to traction and braking actions. Transverse forces Q are produced, for example, in cornering. When the V-shaped sipes 30 are stressed by longitudinal forces L the legs 31, 32 of the sipe 30 can open, as a result of which the number of traction edges is increased, thus improving the traction and braking response, whereas when stressed by transverse forces Q the sipes 30 are closed, as a result of which a stiffening of the block 26 materializes. This stiffening results from the fact that the two parts of the block 26, separated from each other by the legs 31, 32 of the V-shaped sipe 30 can mutually support each other. Slipping of individual block parts past each other, as occurs in the case with conventional sipes, oriented linearly to the outer edge 14 of the tread pattern 17, is avoided by the V-shaped configuration of the sipe 30. Thus, as compared to conventional sipes a sufficiently stiff block 26 materializes due to the V-shaped configuration of the sipe 30 even when stressed by transverse forces Q. This is particularly of advantage to the handling and ride of the tire provided with the tread pattern 10 in dry, wet as well as snow-bound pavement conditions.

Referring now to the FIGS. 3a to 3f there are illustrated various variants in configuring blocks 26 on the tread pattern 10 and in arranging the V-shaped sipes 30 in the blocks 26. For a better appreciation the illustration is greatly simplified and depicted merely schematically. Only one V-shaped sipe 30 is illustrated in each of the blocks 26 depicted square for the sake of simplicity, whereby the V-shaped sipes 30 are illustrated greatly magnified for a better appreciation of how the V-shaped sipes 30 are oriented. Furthermore, only one V-shaped sipe 30 is evident per block 26, it being appreciated, of course, that several V-shaped sipes 30 differing in size and array may be provided in each block 26.

Figure 3A:
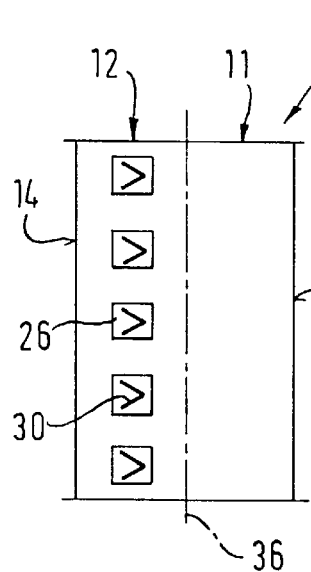
FIGS. 3a to 3f show various schematic array variants of blocks incorporating V-shaped sipes in the tread pattern.

The array variant as represented in FIG. 3a corresponds substantially to the array as shown in FIG. 1. As is evident from FIG. 3a the blocks 26 provided with the V-shaped sipes 30 are disposed on the outer shoulder 12 of the tread pattern 10. The intersections of the legs of the V-shaped sipes 30 are oriented in the direction of the center line 36 of the tread pattern 10.

Figure 3B:
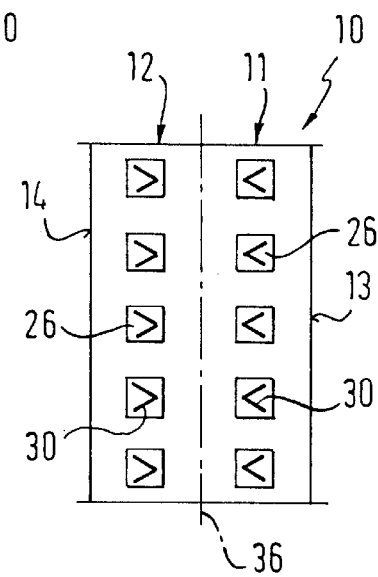
Figure 3C:
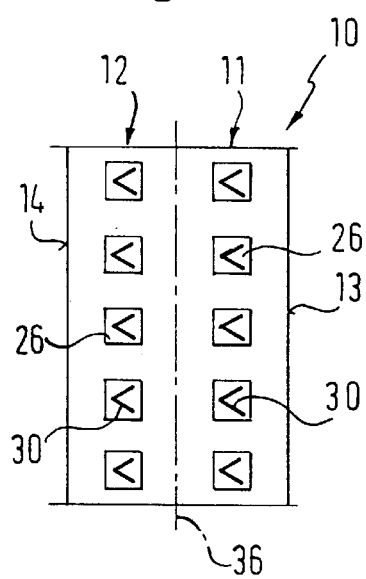

Referring now to FIG. 3b, it is evident that the blocks 26 provided with V-shaped sipes 30 are disposed on both the outer shoulder 12 and the inner shoulder 11 of the tread pattern 10, the orientation of the V-shaped sipes 30 on the outer shoulder 12 corresponding to that as depicted in FIG. 3a. The V-shaped sipes 30 on the inner shoulder 11 of the tread pattern 10 are oriented such that also their intersections of the legs are oriented in the direction of the center line 36 of the tread pattern 10, as a result of which an array materializes in which the blocks 26 are disposed opposite each other relative to the center line 36 each comprise V-shaped sipes 30 oriented opposingly.

In the embodiment as shown in FIG. 3c again blocks 26 having V-shaped sipes 30 are disposed on both the inner shoulder 11 and on the outer shoulder 12 of the tread pattern 10. In this arrangement the orientation of the V-shaped sipes 30 on the outer shoulder 12 of the tread pattern 10 is such that the free ends of the legs of the V-shaped sipes 30 are oriented in the direction of the center line 36 of the tread pattern. The orientation of the V-shaped sipes 30 on the inner shoulder 11 of the tread pattern 10 corresponds to the orientation of the V-shaped sipes 30 on the inner shoulder 11 as shown in FIG. 3b. Due to this orientation and array a tread pattern is defined in which each of the blocks 26 opposite each other relative to the center line 36 comprises V-shaped sipes 30 oriented unidirectionally.

Figure 3D:
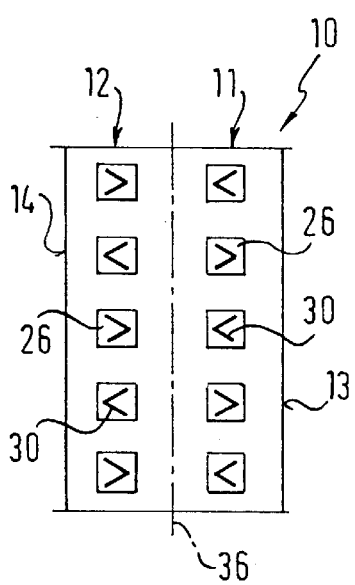

In the embodiment as shown in FIG. 3d a tread pattern 10 is illustrated in which the blocks 26 provided with V-shaped sipes 30 are arranged on both the inner shoulder 11 and on the outer shoulder 12 of the tread pattern 10. In this array the blocks 26 disposed juxtaposed on the inner shoulder 11 or outer shoulder 25 of the tread pattern 10 each comprise V-shaped sipes 30 oriented alternatingly in opposite directions. At the same time the blocks 26 located opposite relative to the center line 36 are likewise provided with V-shaped sipes 30 oriented in opposite directions to each other.

Figure 3E:
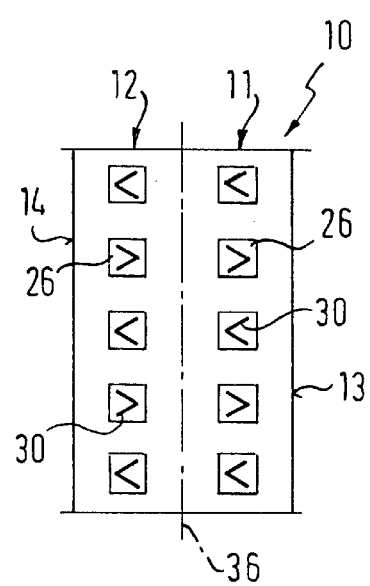

In FIG. 3e an embodiment of the tread pattern 10 in accordance with the invention is illustrated which substantially corresponds to the array as shown in FIG. 3d, except that in this example embodiment unlike the previous embodiment the blocks 26 disposed opposite each other relative to the center line 36 each comprise V-shaped sipes oriented unidirectionally to each other.

Figure 3F:
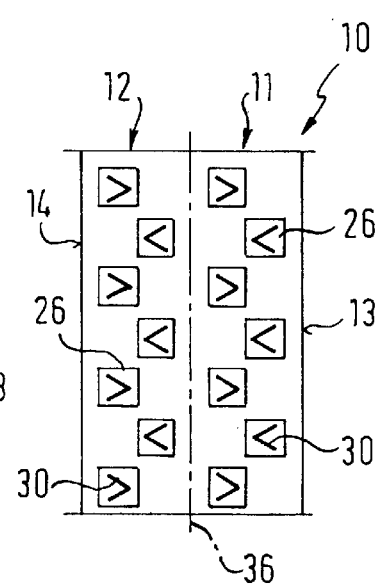

In conclusion, in referring to FIG. 3f, there is illustrated an embodiment of the invention in which the blocks 26 provided with the V-shaped sipes 30 are arranged distributed over the full surface area of the tread pattern 10.

In this array, in some blocks 26 the free ends 31a, 32a of the legs 31, 32 of the V-shaped sipes are oriented in the direction of the center line of the tread pattern 10, whereas in other blocks 26 the intersections 33 of the legs 31, 32 (evident from FIG. 2) of the V-shaped sipes 30 are oriented in the direction of the center line 36 of the tread pattern 10. The array of the blocks 26 on the tread pattern 10 is such that the blocks 26 are each disposed in a zig-zag array in portions left and right relative to the center line 36 of the tread pattern 10. Arranging the V-shaped sipes in the left and right portion of the tread pattern is selected so that each adjacent V-shaped sipe 30 is disposed alternatingly in the opposite direction, whereas blocks 26 located at the same level relative to the center line 36 in the left and right portion of the tread pattern 10 comprise V-shaped sipes 30 oriented unidirectionally, thus resulting in a tread pattern 10 in which the orientation of adjacent V-shaped sipes is opposite in direction in each case, whilst the orientation of blocks 26 located at the same level is unidirectional.

It will be appreciated that the array possibilities of the blocks 26 provided with V-shaped sipes 30 in accordance with the invention on the tread pattern 10 illustrated in FIGS. 3a to 3f as well as the orientations of the sipes are to be understood as being purely exemplary by nature and not conclusively. Other array possibilities are just as conceivable in which, for example, the blocks may be arranged randomly on the tread pattern, and in which the orientation of the V-shaped sipes is also selected randomly. Furthermore, any other shape or regular arrays of blocks having V-shaped sipes as well as the orientation thereof is conceivable and is thus covered by the scope of protection afforded by the following claims.

What is claimed is:

1. A tread for a vehicle tire including at least one circumferentially extending longitudinal groove and, emanating from the longitudinal groove, transverse grooves for defining blocks in a pattern and sipes arranged in the tread, each sipe defining a sipe depth extending from a pattern face of the tread toward a pattern base of the tread, wherein at least one of the sipes is located in at least one of the blocks and is configured to have legs defining a V-shape, wherein an intersection of the legs is arranged in a side surface area of the block facing the longitudinal groove, and wherein ends of the legs are oriented away from the side surface area.

2. The tread of claim 1, wherein at least one other sipe is located in a same block and is configured to have legs defining a V-shape, and wherein the intersection of the legs of the at least one other sipe is connected to the side surface area of the block by a sipe web.

3. The tread of claim 1, wherein the legs of the at least one of the sipes have a same length.

4. The tread of claim 2, wherein the side surface area of the block comprises a nick in a portion connected to the intersection of the legs by the sipe web.

5. The tread of claim 1, wherein the blocks comprise blocks having different lengths, and a differing number of V-shaped sipes are provided in each of the blocks having different lengths.

6. The tread of claim 1, wherein the depth of the sipes is between ¼ of a total height of the block and the total height of the block.

7. The tread of claim 1, wherein the at least one of the blocks comprising at least one sipe configured to have legs defining a V-shape is located at an outer shoulder or an inner shoulder of the tread, or wherein one or more of the at least one of the blocks comprising at least one sipe configured to have legs defining a V-shape are located at an outer shoulder of the tread and one or more of the at least one of the blocks comprising at least one sipe configured to have legs defining a V-shape are located at an inner shoulder of the tread.

8. The tread of claim 1, wherein several blocks are provided, each of which comprises at least one sipe configured to have legs defining a V-shape, and wherein the several blocks are distributed over a full surface area of the tread.

9. The tread of claim 1 or claim 2, wherein free ends of the legs of the at least one sipe configured to have legs defining a V-shape are oriented toward a center line of the tread.

10. A winter tire having a tread as set forth in claim 9.

11. The tread of claim 1 or claim 2, wherein the intersection of the legs of the at least one sipe configured to have legs defining a V-shape is oriented toward a center line of the tread.

12. A winter tire having a tread as set forth in claim 11.

13. The tread of claim 1 or claim 2, wherein several blocks are provided, each of which comprises at least one sipe configured to have legs defining a V-shape, wherein free ends of the legs of one or more of the at least one sipe configured to have legs defining a V-shape are oriented toward a center line of the tread and wherein the intersection of the legs of one or more of the at least one sipe configured to have legs defining a V-shape is oriented toward the center line of the tread, wherein:

an orientation of the free ends in the blocks on a first side of the center line of the tread is unidirectional or alternates directions, an orientation of the free ends in the blocks on a second side of the center line of the tread is unidirectional or alternates directions, and the orientation of the free ends in the blocks on a first side of the center line of the tread is the same as or the opposite of the orientation of the free ends in the blocks on a second side of the center line of the tread.

14. A winter tire having a tread as set forth in claim 13.

15. A winter tire having a tread as set forth in any one of claims 1 to 8.

* * * * *